US009164864B1

(12) United States Patent
Novick et al.

(10) Patent No.: US 9,164,864 B1
(45) Date of Patent: Oct. 20, 2015

(54) MINIMIZING FALSE NEGATIVE AND DUPLICATE HEALTH MONITORING ALERTS IN A DUAL MASTER SHARED NOTHING DATABASE APPLIANCE

(75) Inventors: Ivan D. Novick, Sunnyvale, CA (US); Timothy Heath, Belmont, CA (US); Sharad Kala, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 253 days.

(21) Appl. No.: 13/338,543

(22) Filed: Dec. 28, 2011

(51) Int. Cl.
*G06F 17/30* (2006.01)
*G06F 11/30* (2006.01)

(52) U.S. Cl.
CPC ...... *G06F 11/3055* (2013.01); *G06F 17/30348* (2013.01)

(58) Field of Classification Search
USPC .......................................................... 707/634
See application file for complete search history.

(56) References Cited

U.S. PATENT DOCUMENTS

| 7,577,701 | B1 * | 8/2009 | Johns et al. | 709/203 |
| 7,818,349 | B2 * | 10/2010 | Frost | 707/802 |
| 2011/0238733 | A1 * | 9/2011 | Yoo et al. | 709/203 |

* cited by examiner

*Primary Examiner* — Amresh Singh
(74) *Attorney, Agent, or Firm* — Barry N. Young

(57) ABSTRACT

A primary master node and a standby master node monitor the health of a shared nothing database appliance to afford high availability while minimizing false negatives and duplicate alerts by executing continuously in parallel complimentary processes that determine whether the database is running, and which master node is the active database master node. The active database master node monitors the health of the components of the database appliance by polling each component to detect failures and warnings, and the other master node monitors the status of the active master node. Upon detecting a failure of the active master node, the other node takes over health monitoring. If the database is not running, the designated primary master node performs health monitoring.

16 Claims, 4 Drawing Sheets

MINIMIZING FALSE NEGATIVE AND DUPLICATE HEALTH MONITORING ALERTS IN A DUAL MASTER SHARED NOTHING DATABASE APPLIANCE

BACKGROUND

This invention relates generally to health monitoring of clusters of distributed server systems, and more particularly to monitoring and reporting on the health of components of a shared nothing distributed database cluster.

Large distributed processing systems, such as shared nothing databases, comprising a cluster of multiple, e.g., thousands of, database servers and storage units are employed by enterprises for storing critical data and for executing applications such as real-time transaction processing, etc. As such, system failures are costly, which necessitates that the systems have high availability. Accordingly, health monitoring systems and processes must quickly detect and report hardware, software and database faults and warnings (alerts) so that they can be promptly addressed to minimize system downtime.

Moreover, it is of utmost importance that the health monitoring systems and processes employed for monitoring system health avoid, or at least minimize, false negatives, i.e., failing to report an alert when it occurs. If something is broken and an alert is not sent, it is worse than reporting that something is failing when it is not. For example, if a disk fails and a RAID-5 mirrored system goes into a degraded mode, a notification must be sent as soon as possible so that the failed disk can be replaced. Otherwise, there is a risk that the system could lose a second disk and then go completely down. Therefore, it is important to report an alert promptly when a problem occurs.

To address this, some existing approaches employ duplicate, redundant hosts one of which actively manages the database, and the other of which is a backup. Health monitoring processes can run on each of the hosts. When the primary host fails, the monitoring process can be manually switched over to the backup host, which is costly and slow. In other approaches, both of the hosts simultaneously run health monitoring processes without communicating with each other. While this has the advantage of continuing health monitoring should one host fail, and may minimize false negatives, it has the disadvantages of requiring additional redundant hardware and of generating duplicated alerts which are costly to process.

It is desirable to avoid or minimize duplicated alerts since they create noise and confusion in the backend alert processing, cause additional load, and are costly to process. For instance, a large customer support center may receive alerts from thousands of customers which require a server farm just to handle the incoming load. If the number of alerts is doubled, the size of the server farm would have to be increased accordingly to handle the increased traffic. Furthermore, more sophisticated logic is required to deal with duplicated alerts in order to avoid generating duplicate support tickets each time an alert is received.

It is desirable to provide systems and methods that address these and other problems of known approaches to monitoring the health of systems, and it is to these ends that the invention is directed.

DESCRIPTION OF PREFERRED EMBODIMENTS

The invention is particularly well adapted for use with massively parallel processing (MPP) distributed database systems, such as shared nothing database systems, and will be described in that context. It will become apparent, however, that this is illustrative of only one utility of the invention and that the invention may be employed effectively with other types of systems.

Figure 1:
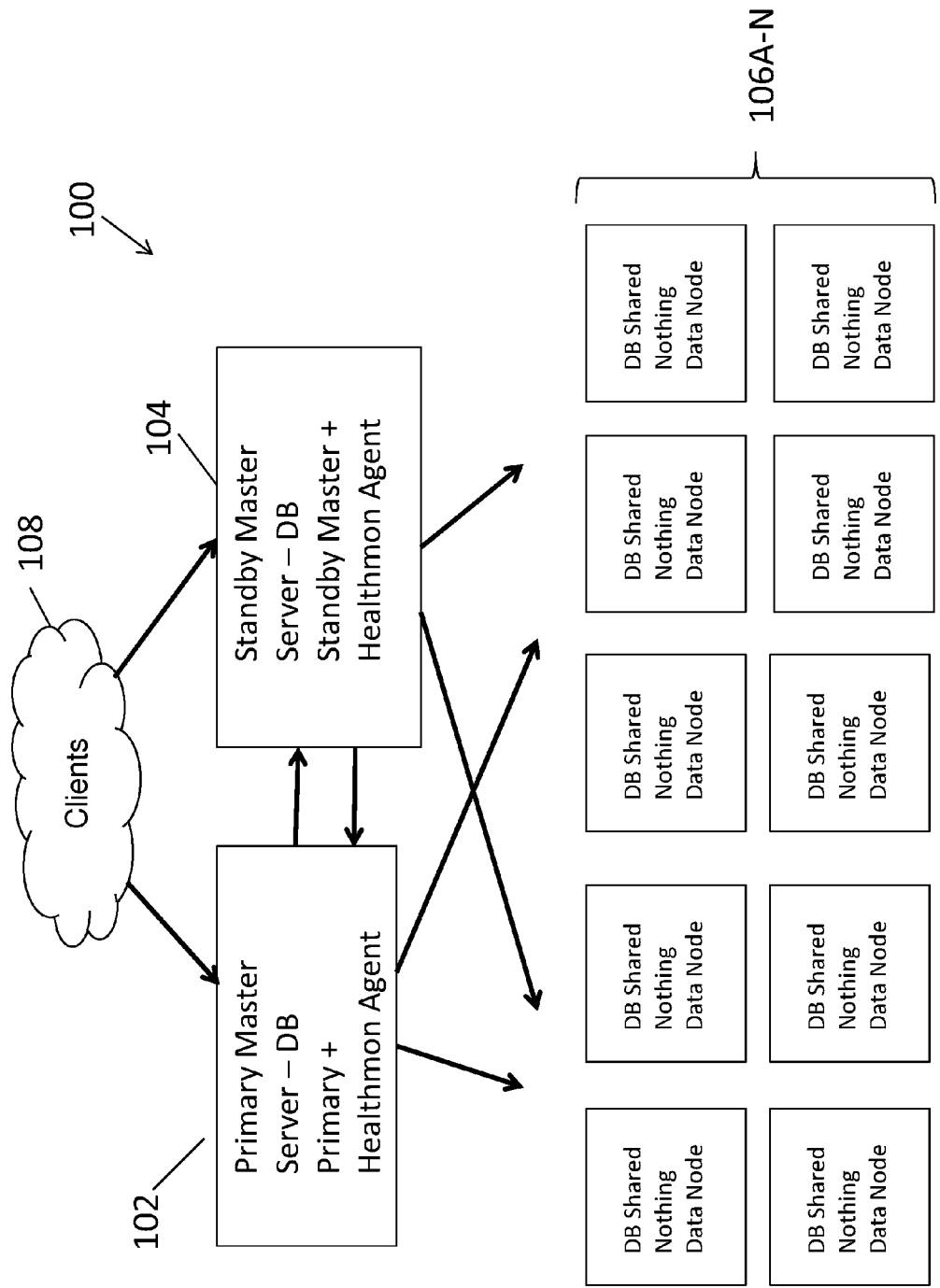
FIG. 1 illustrates an architecture of a distributed shared nothing database embodying the invention.

FIG. 1 illustrates the architecture of a database appliance 100 of a shared nothing massively parallel processing (MPP) database system embodying the invention. Advantageously, the appliance may include dual redundant master server nodes 102 and 104 that connect to and each of which may manage a plurality of shared-nothing data nodes 106A through 106N. Each data node may comprise a plurality of database servers and segments (database instances) including one or more primary databases and one or more mirrored (backup) databases which together comprise the distributed shared nothing database. The master nodes 102 and 104 may be substantially identical server nodes. One master node, e.g., node 102, may be initially designated as the default "primary master" node. In this capacity it serves as the active database master and is responsible for controlling the database. The other master node 104 is designated a "standby master" node which serves as a backup for the primary master node 102. It assumes control of the database in the event of a failure of node 102, in which case it becomes the new "primary master" node. The active database master could be either, but only one, of the two hosts 102 and 104 at any given time. The database cluster has only a single server that is active and acts as a database master at any given time, although there are many worker servers in the shared nothing data nodes 106A-N that handle the actual shared nothing database data. The active database master maintains metadata as to where (on which nodes) the data is stored.

As shown by the arrows in the figure, the primary master 102 and the standby master 104 may communicate with each other and with the shared nothing data nodes 106A-N. Clients 108 may interact with the database through either the master node 102 or the master node 104, as indicated in the figure, depending upon which node is the active primary master at the time.

As will be described, in an embodiment of the invention, the primary master 102 and the standby master 104, respectively, automatically run concurrently, independently and in parallel complementary primary and standby health monitoring processes, also referred to herein as "healthmon" agents. As explained below, the health monitoring processes on the masters may each comprise two constituent processes. The first constituent process, which may be referred to as a "resolution" process, resolves which of the two master nodes is the active master node and should perform health monitoring at any given time. The second constituent process comprises a "health monitor" that actually performs health monitoring of the database appliance components. As will be described in more detail in connection with FIGS. 3 and 4, the first resolution constituent processes each independently and substantially continuously determines, in parallel, whether the primary and standby master nodes are up and running, whether the database is up and running, and on which node the database is running, i.e., is the active database master. The initially designated "primary" master node is the default node for performing actual health monitoring if that node is up and running and it is the active database master. Otherwise, if the primary master node is not up and running but the database is up and running on the standby master node, the health monitor on the standby master node will perform actual health monitoring. Only one health monitor process, preferably the one on the active master node, actually performs health monitoring of the appliance components and reporting of status at any given time. This node becomes the "primary master" node. The other "standby master" node in parallel monitors the state of the primary master node so that it can take over should the primary master node fail. The health monitor process on the active master node detects and report faults and warnings of the database appliance components, to include hardware faults and warnings, operating system and other software faults and warnings, and database faults and warnings. The health monitor on the standby master does not run if the health monitor is running on the primary master node. Thus, only one set of alerts is generated and duplicate alerts are avoided.

In an embodiment, health monitoring is performed on the same host as the active database master as this affords fast database monitoring and allows for the monitoring results (status reports, alerts, etc.) to be directly and quickly loaded into the database for storage. Additionally, the monitoring agent may collect system metrics and other data from the entire database cluster, which could be a large amount of data. If monitoring is performed on a different host from the active host on which the database is running, a performance disadvantage will be incurred when the monitoring results are loaded into the database over the network.

As will also be described below, the health monitor constituent process of the overall health monitoring processes, is preferably an active process that substantially continuously polls each component of the appliance for its status and reports the results, rather than being a passive process that awaits indications of faults and warnings. The health monitoring process may comprise a software routine that repeatedly scans a list of the principal hardware, software and database components of the appliance, actively checks the corresponding items and status values of each of the listed components, and reports on the status of each component. This advantageously permits the list of components and items and status values to be easily updated as desired, as when new or different components are added to the system, without the necessity of rewriting the basic health monitor software routine.

Figure 2:
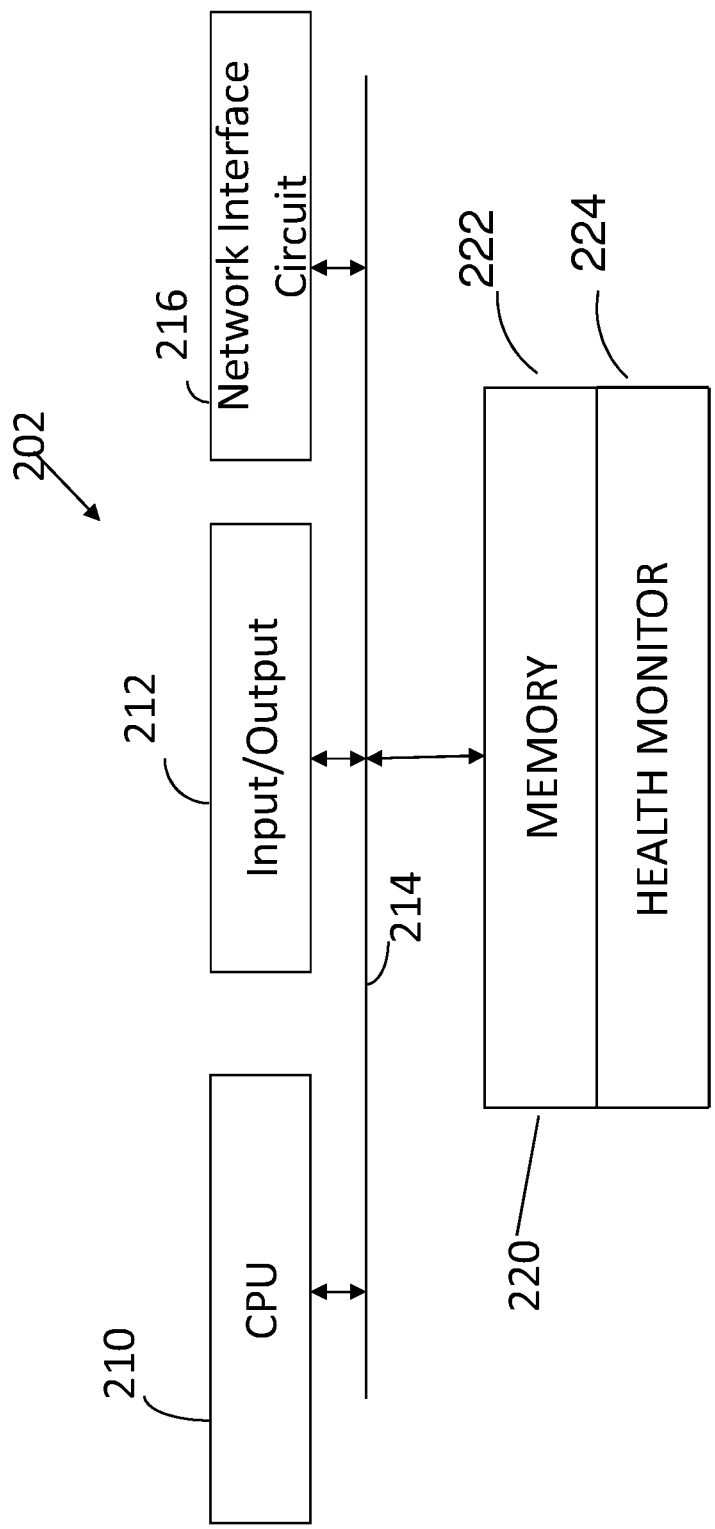
FIG. 2 illustrates a master node architecture of the shared nothing database of FIG. 1 which may incorporate an embodiment of the invention.

FIG. 2 illustrates an example of an architecture of a master server node 202 configured to perform processes and operations in accordance with the invention. Both master nodes 102 and 104 may have this architecture. The master node 202 may comprise a host computer server system 210 (which may comprise a single CPU or may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in the networked environment of the database cluster of FIG. 1. Clients 108 (FIG. 1) may communicate with the distributed database through the master node 202 using either the I/O devices or the network interface circuit. The master node may also have a memory 220 comprising physical storage media connected to the bus that embodies executable instructions to control the operations of the host computer system. Memory 220 may include a main memory 222 and storage 224 for the health monitor process, comprising instructions that control the CPU to perform health monitoring and reporting in accordance with the invention, as will be described.

Figure 3:
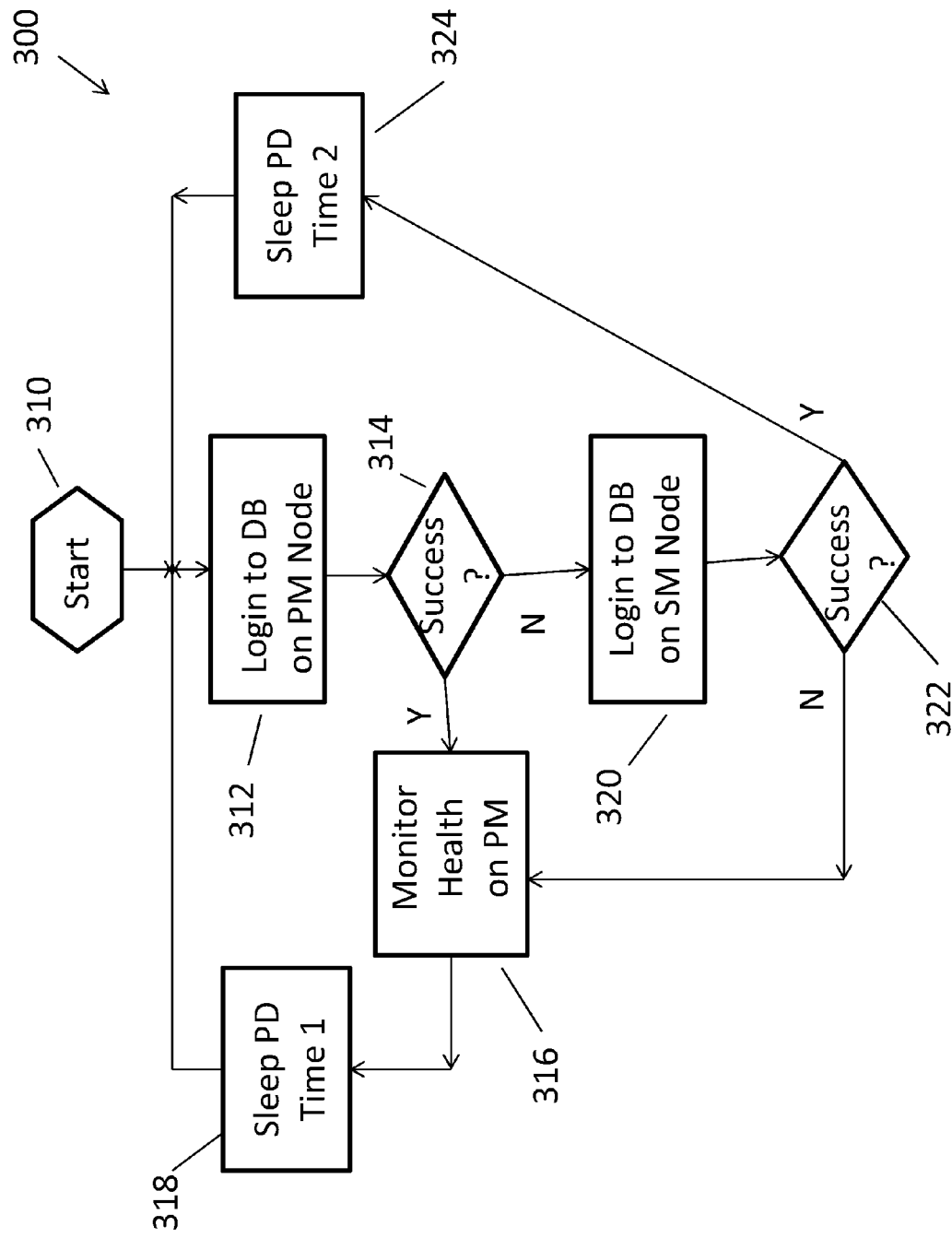
FIG. 3 illustrates a health monitoring process on a primary master node of the system of FIG. 1.
Figure 4:
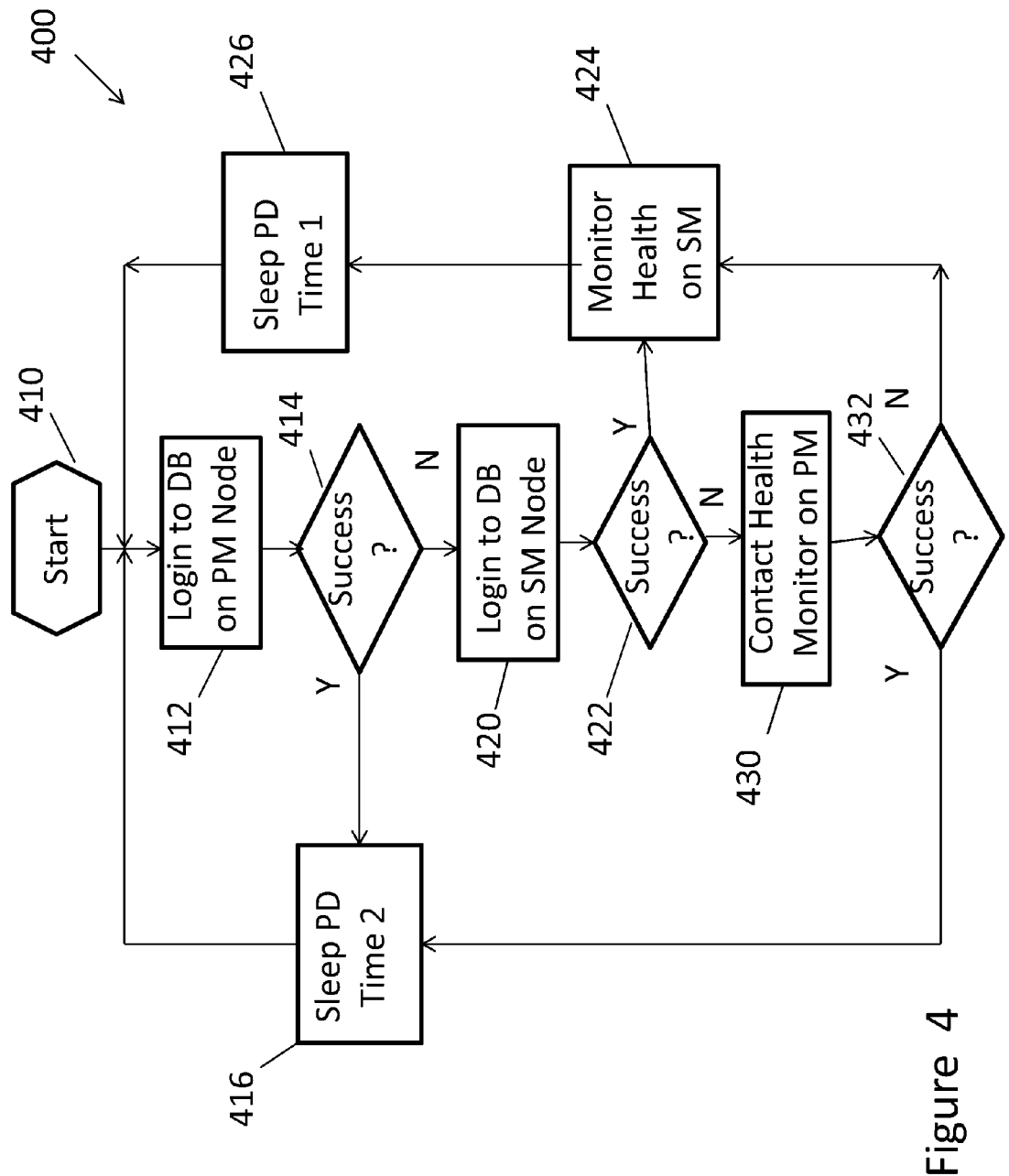
FIG. 4 illustrates a companion health monitoring process on a standby master node of the system of FIG. 1.

FIG. 3 illustrates a primary master health monitoring process 300 that runs on the master node that is designated as the primary master (PM), and FIG. 4 illustrates a standby master health monitoring process 400 that runs on the other master node designated as the standby master node (SM). The two processes are complimentary cooperative processes that may start and run on the two nodes substantially concurrently, continuously, independently of each other. The processes need not execute in synchronism. As will be described, the processes execute in continuous loops to independently monitor the status of the master hosts and the database to determine which of the two master hosts is the active master, the state of the database, which master host will perform health monitoring at a given time, and to automatically perform health monitoring on that host. The primary health monitoring process 300 may run on the master host which is determined to be the active database master, and the standby master health monitoring process 400 may run on the other master host.

As shown in FIG. 3, the primary master health monitoring process starts at 310 and attempts to login to the database on the primary master node at 312 by issuing a query. If at 314 the login is successful, this indicates that the primary master is up and running, the database is up and running, and the primary master is the active master. The primary master then performs health monitoring of the components of the database appliance at 316 by contacting, in sequence, each machine (node) of the database appliance to obtain the status of its constituent hardware and software components parts. As described above, the health monitoring process may employ a list of the components of the database, their constituent parts, and the expected status values of each. Alerts may be provided to the primary master for any failures or warnings noted during health monitoring, and the results of health monitoring may be stored in the database. Following health monitoring, the process may sleep at 318 for a first predetermined period of time (Time 1) after which the process loops back to step 312 and repeats. Time 1 may be of the order of 1-5 seconds, and preferably about 1 second, for example, so that the health monitoring process is repeatedly performed substantially continuously.

If, however, the attempted login to the database on the primary master node at step 314 is unsuccessful, the health monitoring process attempts to login to the database on the standby master node at 320. If, at 322, login is determined to be successful, this means that the standby master node is the active master and will be performing health monitoring of the database appliance, as will be explained in connection with FIG. 4. The primary master process 300 then sleeps for a second predetermined period of time (Time 2) at 324, after which the process loops back to step 312 and repeats. Since a successful login at step 322 means that health monitoring is being performed on the standby master (as will be explained in connection with FIG. 4), sleep Time 2 may be longer than sleep Time 1, e.g., 1-5 minutes, since the likelihood of the running standby master node failing is small, and the necessity for checking its status need not be repeated as quickly.

If, however, at step 322 the attempted login to the database on the standby master node is unsuccessful, this indicates that the database is down and is not running on either master node.

In this event, the process loops back to step 316 where the health monitor begins executing on the primary master node to at least monitor the health of the other non-database components, and process 300 repeats An alert may be sent in this situation if the health monitoring process detects that the database was not stopped gracefully by a database administrator (DBA), but stopped running due to a software fault or database crash.

FIG. 4 illustrates the complementary standby master health monitoring process 400 that runs on the standby master concurrently with the primary master health monitoring process 300 on the primary master. The primary master and standby master health monitoring processes 300 and 400, respectively, preferably start at substantially the same time. Process 400 starts at 410. At 412, the standby master attempts to login to the database on the primary master by issuing a query to the database. If the login is successful (step 414), this indicates that the database is up and running on the primary master, and that health monitoring is being done on the primary master. In this event, the standby master process 400 sleeps at 416 for a predetermined period of time, Time 2, which may be the same as predetermined Time 2 in step 324 of FIG. 3, i.e., 1-5 minutes, and then loops back to step 412 where the process steps 412, 414 and 416 repeat in a continuous loop.

If, however, the attempted login to the database on the primary master node is unsuccessful, this means that the database is not running on the primary master and the standby master process 400 attempts to login to the database on the standby master node at 420. If the login is successful (422) this means that the database is running on the standby master and health monitoring is performed at 424 on the standby master. Health monitoring process 424 on the standby master may be substantially the same as health monitoring process 316 (FIG. 3) on the primary master. When health monitoring is complete and 424, the process 400 sleeps at 426 for a predetermined period of time, Time 1, which may be the same as predetermined Time 1 (318) of process 300, e.g., 1-5 seconds, and preferably 1 second. The process then loops back to step 412 and repeats.

If, however, the attempted login to the database on the standby master node at step 420 is unsuccessful (422), this means that the database is not running on either of the primary master or the standby master nodes, as was the case for the unsuccessful attempted login at step 320 of the primary master health monitoring process 300 of FIG. 3. In this event, process 400 attempts at step 430 to contact the health monitor on the primary master. If, at 432, process 400 successfully contacts the health monitor on the primary master, the standby master assumes that the primary master is functional and that health monitoring is being performed on the primary master (at step 316 of FIG. 3). Process 400 then progresses to step 416 where it sleeps for the predetermined Time 2.

On the other hand, if at step 432 process 400 is unsuccessful in contacting the health monitor on the primary master (at 430), this means that neither the database nor the primary master is up and running, and process 400 proceeds to step 424 where health monitoring is performed on the standby master, after which the process sleeps for predetermined Time 1 (at 426) and then repeats.

FIGS. 3 and 4 illustrate the compatibility of the primary master and standby master health monitoring processes, 300 and 400, respectively, and how they cooperate to an overall redundant dual master health monitoring process that ensures high database availability while minimizing false negatives and duplicate alerts.

There are several different possible situations which the invention effectively handles. When the database is running on the primary master, the health monitor on the primary master will be active and the health monitor on the standby master will passive, although the standby master process can continue to monitor the database and the primary master to detect any failures, and can assume control of the database should the primary master fail.

On the other hand, if the database is running on the standby master, the health monitoring process on the standby master will be the active health monitor and the health monitor on the primary master will be passive. This is possible because the both health monitors can connect to the active database server, and the processes 300 and 400 can independently monitor the status of the database and the primary and standby master servers, the appropriate process can perform health monitoring as needed.

If the database is not running at all, but both master hosts are up and running, the health monitor on the primary master host will be active and health monitor on the standby master host will be passive. Although neither health monitor is able to connect to the database, the standby health monitor is able to communicate with the primary health monitor and confirm that it is up and functioning.

If the database is not running and the primary master host is down, the health monitor on the standby master will not be able to connect either to the database or to the health monitor on the primary master. In this case, the health monitor on the standby master host will perform health monitoring. Since the primary master is down, it will be done duplication of alerts.

On the other hand, if the database is not running and the standby master is down, the primary master health monitor will not be able to connect either to the database or to the standby master. In this case, the primary master health marker will take priority and perform health monitoring. Since the standby master is down, there will be no duplication of alerts.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method of monitoring the health of a database appliance comprising a database distributed on a plurality of database nodes, and having redundant master nodes including a primary master node and a standby master node, the database being active on and controlled by only one of said redundant master nodes at a time, the method comprising:

executing concurrently in parallel and independently on both said redundant master nodes a database monitoring process, said database monitoring process comprising a resolution process and a health monitor process, the resolution process resolving on which one of said redundant master nodes said database is active at said time, said one node being designated the primary master node, and confirming that said primary master node is executing said health monitor process to monitor hardware and software components of said database and report alerts, the other redundant master node being the standby master node and not issuing alerts;

resolving by executing said resolution process in parallel by said primary master node and said standby master node whether the database is running on said primary master node, including:

attempting, by the primary master node, a first login to the database on the primary master node; and attempting concurrently, by the standby master node, a second login to the database on the primary master node;
upon said first and second logins being successful, resolving by the resolution process on the primary master node that the database is running on the primary master node and that the primary master node is executing said health monitor process of hardware and software components of the database;
monitoring by the standby master node the status of the primary master node to detect a failure of the primary master node, including:
attempting, by the standby master node, a third login to the database on the primary master node after a first predetermined period of time;
upon identifying that the third login attempt is unsuccessful, determining that the primary master node has failed based on the unsuccessful third login attempt; and
upon determining said failure of the primary master node by the standby master node:
attempting, by the standby master node, a fourth login to the database on the standby master node;
upon the fourth login attempt by the standby master node being successful, determining that the database is active on said standby master node; and
executing said health monitor process of said components of said database by the standby master node in response to determining that the fourth login attempt was successful.

2. The method of claim 1, where attempting said first login comprises issuing a database query to the primary master node, and determining that the database is running upon receiving a response to the query.

3. The method of claim 1 further comprising waiting a second predetermined period of time following said executing said health monitor process by said primary master node, and repeating said determining and health monitor process by said primary master node.

4. The method of claim 1, wherein said first predetermined period of time is of the order of about 1-5 minutes and said second predetermined period of time is of the order of about 1-5 seconds.

5. The method of claim 1, further comprising:
attempting, by the standby master node, a fifth login to the database on the standby master node;
determining that said fifth login to the database on the standby master node is unsuccessful;
in response to determining that said fifth login attempt was unsuccessful, attempting, by the standby master node, to contact a health monitor process on the primary master node; and, if said contact is unsuccessful, performing said health monitor process by said standby master node.

6. The method of claim 1, wherein said health monitor process comprises polling said hardware and software components to determine their status, and issuing alerts upon detecting a failure or a warning.

7. The method of claim 1 further comprising determining, upon said first and second logins being unsuccessful, that said database is not operating, and issuing an alert by one of said redundant master nodes.

8. Non-transitory computer readable media storing executable instructions for controlling the operation of a computer to perform health monitoring of a database appliance that includes a database distributed on a plurality of database nodes, and having redundant master nodes including a primary master node and a standby master node, the database being active on and controlled by only one of said redundant master nodes at a time, comprising instructions for:
executing concurrently in parallel and independently on both said redundant master nodes a database monitoring process, said database monitoring process comprising a resolution process and a health monitor process, the resolution process resolving on which one of said redundant master nodes said database is active at said time, said one node being designated the primary master node, and confirming that said primary master node is executing said health monitor process to monitor hardware and software components of said database and report alerts, the other redundant master node being the standby master node and not issuing alerts;
resolving by executing said resolution process in parallel by said primary master node and said standby master node whether the database is running on said primary master node, including:
attempting, by the primary master node, a first login to the database on the primary master node; and
attempting concurrently, by the standby master node, a second login to the database on the primary master node;
upon said first and second logins being successful, resolving by the resolution process on the primary master node that the database is running on the primary master node and that the primary master node is executing said health monitor process of hardware and software components of the database;
monitoring by the standby master node the status of the primary master node to detect a failure of the primary master node, including:
attempting, by the standby master node, a third login to the database on the primary master node after a first predetermined period of time;
upon identifying that the third login attempt is unsuccessful,
determining that the primary master node has failed based on the unsuccessful third login attempt; and
upon determining said failure of the primary master node by the standby master node:
attempting, by the standby master node, a fourth login to the database on the standby master node;
upon the fourth login attempt by the standby master node being successful, determining that the database is active on said standby master node; and
executing said health monitor process of said components of said database by the standby master node in response to determining that the fourth login attempt was successful.

9. Non-transitory computer readable media according to claim 8, wherein said instructions for attempting said first login comprise instructions for issuing a database query to the primary master node, and determining that the database is running upon receiving a response to the query.

10. Non-transitory computer readable media according to claim 8 further comprising instructions for waiting a second predetermined period of time following said executing said health monitor process by said primary master node, and repeating said determining and health monitor process by said primary master node.

11. Non-transitory computer readable media according to claim 8, further comprising instructions for:
attempting, by the standby master node, a fifth login to the database on the standby master node;
determining that said fifth login to the database on the standby master node is unsuccessful;

in response to determining that said fifth login attempt was unsuccessful, attempting, by the standby master node, to contact a health monitor process on the primary master node; and, if said contact is unsuccessful, performing said health monitor process by said standby master node.

12. Non-transitory computer readable media according to claim 8, wherein said health monitor process comprises instructions for polling said hardware and software components to determine their status, and for issuing alerts upon detecting a failure or a warning.

13. A method of monitoring the health of a database appliance comprising a database distributed on a plurality of database nodes, and having redundant master nodes including a primary master node and a standby master node, the database being active on and controlled by only one of said redundant master nodes at a time, the method comprising:

executing concurrently in parallel and independently on both said redundant master nodes a database monitoring process, said database monitoring process comprising a resolution process and a health monitor process, the resolution process resolving on which one of said redundant master nodes said database is active at said time, said one node being designated the primary master node, and confirming that said primary master node is executing said health monitor process to monitor hardware and software components of said database and report alerts, the other redundant master node being the standby master node and not issuing alerts;

resolving by executing said resolution process in parallel and concurrently by said redundant master nodes on which one of said redundant master nodes the database is currently active;

designating said one redundant master node on which the database is currently active as the primary master node, and designating the other redundant master node as the standby master node;

executing substantially continuously by said primary master node and by said standby master node said resolution processes to confirm that the database remains active on the primary master node;

upon confirming the database remains active on the primary master node, executing by the primary master node the health monitor process to monitor the health of said database, and executing concurrently by said standby master node said health monitor process to monitor the health of said primary master node;

upon the health monitor process executing on the primary master node determining that the database has failed, issuing a first alert and executing by said standby master node said health monitor process of said database to confirm said failure;

upon determining by said primary master node said database failure, issuing a second alert; and otherwise upon the health monitor process on the standby master node determining that either or both the primary master node or the database has failed, issuing by the standby master node a third alert.

14. The method of claim 13, wherein said resolving comprises issuing by each of said redundant master nodes a database query to both of said redundant master nodes, and resolving the master node on which the database is active by a response to said query.

15. The method of claim 13, wherein said standby master node confirms the failure of the database on the primary master node by attempting unsuccessfully to login to the database on the primary master node.

16. The method of claim 13, wherein said standby master node monitors the health of said primary master node by attempting to contact the health monitor process on the primary master node, and determines that the primary master node has failed if said contact is unsuccessful.

* * * * *